(12) United States Patent
Lawrence et al.

(10) Patent No.: US 7,899,722 B1
(45) Date of Patent: Mar. 1, 2011

(54) CORRESPONDENT BANK REGISTRY

(75) Inventors: David Lawrence, New York, NY (US); Carl Young, New York, NY (US)

(73) Assignee: Goldman Sachs & Co., New York, NY (US)

( * ) Notice: Subject to any disclaimer, the term of this patent is extended or adjusted under 35 U.S.C. 154(b) by 361 days.

(21) Appl. No.: 10/278,380

(22) Filed: Oct. 23, 2002

Related U.S. Application Data

(63) Continuation-in-part of application No. 10/074,583, filed on Feb. 12, 2002, now Pat. No. 7,287,280, and a continuation-in-part of application No. 10/021,124, filed on Oct. 30, 2001, now abandoned, which is a continuation-in-part of application No. 09/812,627, filed on Mar. 20, 2001.

(60) Provisional application No. 60/390,937, filed on Jun. 24, 2002.

(51) Int. Cl.
*G06Q 40/00* (2006.01)

(52) U.S. Cl. .......... 705/35; 705/36 R; 705/36 T; 705/37; 705/38

(58) Field of Classification Search ............ 705/64, 705/65, 70, 75, 76, 80, 35–38, 42, 44
See application file for complete search history.

(56) References Cited

U.S. PATENT DOCUMENTS

| | | | |
|---|---|---|---|
| 593,882 A * | 11/1897 | Asay et al ............... 81/176 |
| 4,326,259 A | 4/1982 | Cooper et al. |
| 4,346,442 A | 8/1982 | Musmanno |
| 4,376,978 A | 3/1983 | Musmanno |
| 4,597,046 A | 6/1986 | Musmanno et al. |
| 4,718,009 A | 1/1988 | Cuervo |
| 4,727,243 A | 2/1988 | Savar |
| 4,734,564 A | 3/1988 | Boston et al. |
| 4,736,294 A | 4/1988 | Gill et al. |
| 4,774,663 A | 9/1988 | Musmanno et al. |
| 4,774,664 A | 9/1988 | Campbell et al. |
| 4,812,628 A | 3/1989 | Boston et al. |
| 4,868,866 A | 9/1989 | Williams, Jr. |
| 4,914,587 A | 4/1990 | Clouse |
| 4,953,085 A | 8/1990 | Atkins |
| 4,989,141 A | 1/1991 | Lyons et al. |
| 5,025,138 A | 6/1991 | Cuervo |

(Continued)

FOREIGN PATENT DOCUMENTS

EP 0999489 A2 5/2000

(Continued)

OTHER PUBLICATIONS

"Specially designated Who? A Primer on OFAC Compliance" ABA Bank Compliance Mar./Apr. 1996, pp. 29-36.*

(Continued)

*Primary Examiner* — Narayanswamy Subramanian
(74) *Attorney, Agent, or Firm* — Chadbourne & Parke LLP; Walter G. Hanchuk

(57) ABSTRACT

Methods and systems are provided for facilitating the transfer of information relating to risk management, such as, for example information directed towards compliance with the USA PATRIOT Act and certification of a foreign correspondent bank. Generally, the a foreign bank or other entity can provide a risk management clearinghouse with information relating to compliance with government requirements, or other information, and allow the risk management clearinghouse to convey to information in whole or in part to interested parties. Centralized distribution of certification related information can facilitate consistent and accurate compliance with government related requirements.

19 Claims, 9 Drawing Sheets

U.S. PATENT DOCUMENTS

| | | | |
|---|---|---|---|
| 5,038,284 A | | 8/1991 | Kramer |
| 5,068,888 A | | 11/1991 | Scherk et al. |
| 5,161,103 A | | 11/1992 | Kosaka et al. |
| 5,177,342 A | * | 1/1993 | Adams .......................... 235/379 |
| 5,210,687 A | | 5/1993 | Wolfberg et al. |
| 5,239,462 A | | 8/1993 | Jones et al. |
| 5,274,547 A | | 12/1993 | Zoffel et al. |
| 5,323,315 A | | 6/1994 | Highbloom |
| 5,347,632 A | | 9/1994 | Filepp et al. |
| 5,398,300 A | | 3/1995 | Levey |
| 5,444,819 A | | 8/1995 | Negishi |
| 5,448,047 A | | 9/1995 | Nair et al. |
| 5,453,601 A | * | 9/1995 | Rosen ............................. 705/65 |
| 5,455,407 A | * | 10/1995 | Rosen ............................. 705/69 |
| 5,457,305 A | | 10/1995 | Akel et al. |
| 5,557,518 A | | 9/1996 | Rosen |
| 5,627,886 A | | 5/1997 | Bowman |
| 5,649,116 A | | 7/1997 | McCoy et al. |
| 5,671,279 A | * | 9/1997 | Elgamal ........................ 705/79 |
| 5,679,938 A | | 10/1997 | Templeton et al. |
| 5,679,940 A | | 10/1997 | Templeton et al. |
| 5,696,907 A | | 12/1997 | Tom |
| 5,704,045 A | * | 12/1997 | King et al. ...................... 705/35 |
| 5,717,923 A | | 2/1998 | Dedrick |
| 5,732,397 A | | 3/1998 | DeTore et al. |
| 5,787,402 A | | 7/1998 | Potter et al. |
| 5,790,639 A | | 8/1998 | Ranalli et al. |
| 5,797,133 A | | 8/1998 | Jones et al. |
| 5,799,087 A | * | 8/1998 | Rosen ............................. 705/69 |
| 5,819,226 A | | 10/1998 | Gopinathan et al. |
| 5,819,236 A | | 10/1998 | Josephson |
| 5,852,812 A | | 12/1998 | Reeder |
| 5,875,431 A | | 2/1999 | Heckman et al. |
| 5,878,400 A | | 3/1999 | Carter, III |
| 5,884,289 A | | 3/1999 | Anderson et al. |
| 5,898,154 A | * | 4/1999 | Rosen .......................... 235/379 |
| 5,920,629 A | * | 7/1999 | Rosen ............................. 705/69 |
| 5,933,816 A | * | 8/1999 | Zeanah et al. .................. 705/35 |
| 5,940,843 A | | 8/1999 | Zucknovich et al. |
| 5,953,423 A | * | 9/1999 | Rosen ............................. 705/65 |
| 5,963,648 A | * | 10/1999 | Rosen ............................. 705/67 |
| 5,963,923 A | | 10/1999 | Garber |
| 5,974,146 A | * | 10/1999 | Randle et al. ................... 705/77 |
| 5,991,743 A | * | 11/1999 | Irving et al. ................ 705/36 R |
| 6,014,228 A | | 1/2000 | Castro |
| 6,016,963 A | | 1/2000 | Ezawa et al. |
| 6,018,723 A | | 1/2000 | Siegel et al. |
| 6,021,397 A | | 2/2000 | Jones et al. |
| 6,047,887 A | * | 4/2000 | Rosen .......................... 235/379 |
| 6,078,904 A | * | 6/2000 | Rebane .......................... 705/36 |
| 6,078,905 A | | 6/2000 | Pich-LeWinter |
| 6,085,175 A | * | 7/2000 | Gugel et al. ................... 705/36 |
| 6,105,007 A | * | 8/2000 | Norris ............................ 705/38 |
| 6,105,010 A | * | 8/2000 | Musgrave ..................... 705/44 |
| 6,119,103 A | * | 9/2000 | Basch et al. .................... 705/35 |
| 6,148,297 A | * | 11/2000 | Swor et al. ........................ 707/3 |
| 6,148,301 A | | 11/2000 | Rosenthal |
| 6,199,073 B1 | | 3/2001 | Peairs et al. |
| 6,205,433 B1 | | 3/2001 | Boesch et al. |
| 6,246,996 B1 | | 6/2001 | Stein et al. |
| 6,249,770 B1 | | 6/2001 | Erwin et al. |
| 6,278,983 B1 | | 8/2001 | Ball |
| 6,289,320 B1 | | 9/2001 | Drummond et al. |
| 6,304,915 B1 | * | 10/2001 | Nguyen et al. ................. 709/250 |
| 6,304,973 B1 | | 10/2001 | Williams |
| 6,317,727 B1 | | 11/2001 | May |
| 6,321,212 B1 | | 11/2001 | Lange |
| 6,330,546 B1 | | 12/2001 | Gopinathan et al. |
| 6,341,267 B1 | | 1/2002 | Taub |
| 6,347,307 B1 | | 2/2002 | Sandhu et al. |
| 6,393,423 B1 | | 5/2002 | Goedken |
| 6,456,984 B1 | | 9/2002 | Demoff et al. |
| 6,513,020 B1 | * | 1/2003 | Weiss et al. ..................... 705/36 |
| 6,542,993 B1 | | 4/2003 | Erfani |
| 6,658,393 B1 | * | 12/2003 | Basch et al. .................... 705/38 |
| 6,671,818 B1 | * | 12/2003 | Mikurak ........................ 714/4 |
| 6,738,760 B1 | | 5/2004 | Krachman |
| 6,785,661 B1 | | 8/2004 | Mandler et al. |
| 6,868,408 B1 | * | 3/2005 | Rosen ............................. 705/64 |
| 6,947,908 B1 | * | 9/2005 | Slater ............................. 705/51 |
| 6,971,026 B1 | | 11/2005 | Fujiyama et al. |
| 7,006,992 B1 | | 2/2006 | Packwood |
| 7,069,234 B1 | * | 6/2006 | Cornelius et al. ............... 705/26 |
| 7,089,208 B1 | * | 8/2006 | Levchin et al. ................. 705/39 |
| 7,124,101 B1 | * | 10/2006 | Mikurak ........................ 705/35 |
| 7,133,846 B1 | * | 11/2006 | Ginter et al. ..................... 705/54 |
| 7,181,428 B2 | | 2/2007 | Lawrence |
| 7,209,889 B1 | * | 4/2007 | Whitfield ........................ 705/14 |
| 7,231,395 B2 | * | 6/2007 | Fain et al. .............................. 1/1 |
| 1,222,816 A1 | * | 8/2008 | Borten ............................. 705/4 |
| 7,415,607 B2 | * | 8/2008 | Sinn ............................ 713/158 |
| 7,426,492 B1 | | 9/2008 | Bishop et al. |
| 7,428,756 B2 | * | 9/2008 | Wookey .......................... 726/26 |
| 7,437,310 B1 | * | 10/2008 | Dutta ............................ 705/26 |
| 7,451,114 B1 | | 11/2008 | Matsuda et al. |
| 7,461,250 B1 | * | 12/2008 | Duane et al. .................. 713/157 |
| 7,506,158 B2 | * | 3/2009 | Fox et al. ...................... 713/156 |
| 7,562,212 B2 | * | 7/2009 | Beattie et al. .................. 713/156 |
| 7,650,496 B2 | * | 1/2010 | Thornton et al. .............. 713/158 |
| 7,653,810 B2 | * | 1/2010 | Thornton et al. .............. 713/158 |
| 7,694,135 B2 | * | 4/2010 | Rowan et al. .................. 713/166 |
| 7,698,549 B2 | * | 4/2010 | Thornton et al. .............. 713/156 |
| 7,698,557 B2 | * | 4/2010 | Saarepera et al. .............. 713/175 |
| 2001/0011243 A1 | | 8/2001 | Dembo et al. |
| 2001/0018674 A1 | * | 8/2001 | Schein et al. ................... 705/35 |
| 2001/0027388 A1 | | 10/2001 | Beverina et al. |
| 2001/0027389 A1 | | 10/2001 | Beverina et al. |
| 2001/0032150 A1 | * | 10/2001 | Terashima ..................... 705/26 |
| 2001/0049651 A1 | | 12/2001 | Selleck |
| 2001/0049793 A1 | | 12/2001 | Sugimoto |
| 2001/0054020 A1 | | 12/2001 | Barth et al. |
| 2001/0056359 A1 | | 12/2001 | Abreu |
| 2002/0016854 A1 | | 2/2002 | Hirasawa et al. |
| 2002/0019804 A1 | | 2/2002 | Sutton |
| 2002/0023053 A1 | * | 2/2002 | Szoc et al. ..................... 705/39 |
| 2002/0032626 A1 | * | 3/2002 | DeWolf et al. .................. 705/35 |
| 2002/0032635 A1 | | 3/2002 | Harris et al. |
| 2002/0032646 A1 | | 3/2002 | Sweeney et al. |
| 2002/0035685 A1 | * | 3/2002 | Ono et al. ..................... 713/155 |
| 2002/0046053 A1 | | 4/2002 | Hare et al. |
| 2002/0087454 A1 | | 7/2002 | Calo et al. |
| 2002/0087455 A1 | * | 7/2002 | Tsagarakis et al. ............. 705/37 |
| 2002/0091635 A1 | | 7/2002 | Dilip et al. |
| 2002/0091706 A1 | | 7/2002 | Anderson et al. |
| 2002/0099640 A1 | | 7/2002 | Lange |
| 2002/0103747 A1 | | 8/2002 | Lawrence |
| 2002/0103852 A1 | * | 8/2002 | Pushka .......................... 709/203 |
| 2002/0111890 A1 | | 8/2002 | Sloan et al. |
| 2002/0120477 A1 | * | 8/2002 | Jinnett ............................ 705/4 |
| 2002/0120582 A1 | * | 8/2002 | Elston et al. ..................... 705/64 |
| 2002/0128964 A1 | * | 9/2002 | Baker et al. ..................... 705/39 |
| 2002/0129255 A1 | * | 9/2002 | Tsuchiyama et al. ......... 713/176 |
| 2002/0138371 A1 | | 9/2002 | Lawrence et al. |
| 2002/0138407 A1 | | 9/2002 | Lawrence et al. |
| 2002/0138408 A1 | | 9/2002 | Lawrence |
| 2002/0138417 A1 | * | 9/2002 | Lawrence ..................... 705/38 |
| 2002/0143562 A1 | | 10/2002 | Lawrence |
| 2002/0152156 A1 | * | 10/2002 | Tyson-Quah ................... 705/38 |
| 2002/0161707 A1 | * | 10/2002 | Cole et al. ....................... 705/42 |
| 2002/0184068 A1 | * | 12/2002 | Krishnan et al. ................. 705/8 |
| 2002/0188861 A1 | | 12/2002 | Townsend |
| 2002/0198827 A1 | * | 12/2002 | van Leeuwen .................. 705/39 |
| 2003/0018483 A1 | * | 1/2003 | Pickover et al. ................. 705/1 |
| 2003/0050718 A1 | * | 3/2003 | Tracy et al. .................... 700/91 |
| 2003/0065942 A1 | | 4/2003 | Lineman et al. |
| 2003/0069742 A1 | | 4/2003 | Lawrence |
| 2003/0069894 A1 | | 4/2003 | Colter et al. |
| 2003/0074272 A1 | | 4/2003 | Knegendorf et al. |
| 2003/0074310 A1 | | 4/2003 | Grovit et al. |
| 2003/0167177 A1 | | 9/2003 | Branch |
| 2005/0187841 A1 | * | 8/2005 | Grear et al. ..................... 705/35 |
| 2006/0218651 A1 | * | 9/2006 | Ginter et al. .................... 726/27 |
| 2008/0021835 A1 | * | 1/2008 | Ginter et al. .................... 705/51 |

FOREIGN PATENT DOCUMENTS

| | | |
|---|---|---|
| EP | 1 137 209 | 9/2001 |
| EP | 1 143 365 | 10/2001 |

| | | |
|---|---|---|
| JP | 02000002061 8 A | 6/1998 |
| JP | 0200350896 A | 8/2001 |
| WO | WO 00/75836 | 12/2000 |
| WO | WO 01/55885 | 8/2001 |

OTHER PUBLICATIONS

"OFAC Compliance: A Perspective for Community Banks", ABA Bank Compliance Nov./Dec. 1998, pp. 39-48.*

"Commentary: Foreign Assets Control Regulations: The Countries Aren't Enough", Letter of Credit Update, Mar. 1996, pp. 23-27.*

Banasiak, Michael, "Don't be Out-Scored by Competition", Credit and Financial Management Review, 2nd Quarter 2000.

International Search Report dated Feb. 3, 2003 for PCT/US02/07110.

International Search Report dated Jun. 2, 2003 for PCT/ US03/03993.

Written Opinion dated Oct. 7, 2003 for PCT/US03/03993.

* cited by examiner

CORRESPONDENT BANK REGISTRY

CROSS REFERENCE TO RELATED APPLICATIONS

This application claims priority to U.S. Ser. No. 60/390,937 filed Jun. 24, 2002 and entitled "Correspondent Bank Registry". This application is a continuation-in-part of a prior application entitled "Risk Management Clearinghouse" filed Feb. 12, 2002 and bearing the Ser. No. 10/074,583 now U.S. Pat. No. 7,287,280, as well as being a continuation-in-part of a prior application entitled "Risk Management Clearinghouse" filed Oct. 30, 2001, and bearing the Ser. No. 10/021,124 now abandoned, which is also a continuation-in-part of a prior application entitled "Automated Global Risk Management" filed Mar. 20, 2001, and bearing the Ser. No. 09/812,627, all of which are relied upon and incorporated by reference.

BACKGROUND

This invention relates generally to a method and system for facilitating the identification, investigation, assessment and management of legal, regulatory, financial and reputational risks ("Risks"). In particular, the present invention relates to a computerized system and method for banks and non-bank financial institution to comply with "know your customer" requirements associated with a correspondent bank.

As money-laundering and related concerns have become increasingly important public policy concerns, regulators have attempted to address these issues by imposing increasing formal and informal obligations upon financial institutions. Government regulations authorize a broad regime of record-keeping and regulatory reporting obligations on covered financial institutions as a tool for the federal government to use to fight drug trafficking, money laundering, and other crimes. The regulations may require financial institutions to file currency and monetary instrument reports and to maintain certain records for possible use in tax, criminal and regulatory proceedings. Such a body of regulation is designed chiefly to assist law enforcement authorities in detecting when criminals are using banks and other financial institution as an intermediary for, or to hide the transfer of funds derived from criminal activity.

Amongst other obligations, sections 313 and 319(*b*) of the Uniting and Strengthening America by Providing Appropriate Tools Required to Intercept and Obstruct Terrorism (USA PATRIOT) Act of 2001 prohibit certain financial institutions from providing correspondent accounts to a foreign Shell Bank and requires financial institutions to take reasonable steps to ensure that a correspondent account provided to a foreign bank is not being used to indirectly provide banking services to foreign Shell Banks. In addition, section 319(b) of the USA PATRIOT Act adds a new subsection (k) to 31 U.S.C. 5318 which requires certain financial institutions that provide correspondent accounts to a foreign bank to maintain records of the foreign bank's owners and agent in the United States designated to accept service of legal process.

The USA PATRIOT Act, provides that a covered financial institution shall not establish, maintain, administer, or manage a correspondent account in the United States for, or on behalf of, a foreign bank that does not have a physical presence in any country (Shell Bank). In addition, the USA PATRIOT Act requires a covered financial institution to take reasonable steps to ensure that any correspondent account established, maintained, administered, or managed by the covered financial institution in the United States for a foreign bank is not being used by that foreign bank to indirectly provide banking services to a foreign Shell Bank that is not a regulated affiliate. Current regulations can require that a certification be established and maintained on a two year cycle.

Bank and non-bank financial institutions, including: an investment bank; a merchant bank; a securities firm, any insured bank (as defined in section 3(h) of the Federal Deposit Insurance Act (12 U.S.C. 1813(h)); a commercial bank or trust company; a private banker; a credit union; a thrift institution; broker dealers securities and commodities trading firms; asset management companies, hedge funds, mutual funds, credit rating funds, securities exchanges and bourses, institutional and individual investors, law firms, accounting firms, auditing firms, or any institution the business of which is engaging in financial activities as described in section 4(k) of the Bank Holding Act of 1956; may be subject to legal and regulatory obligations associated with the USA PATRIOT Act, hereinafter collectively referred to as "Financial Institution." Financial Institutions typically have few resources available to them to assist in establishing and maintaining necessary records.

Establishing and maintaining certifications required under the USA PATRIOT ACT can be onerous to both a Financial Institution and to a foreign counterpart seeking to provide required information. Uncertainty can surround what the certification requirements are and how to properly fulfill them. Directions given by the U.S. Treasury Department estimate that a qualified person may take approximately twenty hours to properly generate a certification. This amount of work may need to be duplicated for each request from each respondent bank. In addition, there exists an increased likelihood of confusion, redundancy, inaccuracy and contradiction if different entities acting on behalf of a single correspondent bank provide certification to multiple respondent institutions.

What is needed is a method and system to coordinate and administer the certification process. Compiled certification information should be situated in a known resource from which it can be conveyed to a compliance department or government entity and also be able to demonstrate to regulators that a Financial Institution has met standards relating to risk containment.

SUMMARY

Accordingly, the present invention provides methods and systems for managing Risk related to a certification process through the utilization of a risk management clearinghouse (RMC). The present invention provides for a certification, such as the certification of a foreign correspondent bank addressing the USA PATRIOT Act, to be accomplished by receiving risk management certification information from a foreign bank and storing the information in a computer server. A request for particular certification information can be received and particular certification information can be transmitted according to the direction of the requestor and/or the provider of the information. Information transmitted can include, for example, certification materials.

In facilitating the risk management process, a RMC can receive a request to register certification information from an interested party or institution. Requests and information received can be docketed, if desired.

In another aspect, a RMC can receive a request for guidance relating to providing certification and responding to the request. For example, in some embodiments, guidance can include ascertaining the completeness of certification information received or notifying appropriate parties of administrative obligations.

Still another aspect can include receiving updated information relating to the certification and transmitting the updated information to appropriate parties. In addition, embodiments can also include requesting authorization to convey information supplied by a party, such as, for example, certification information, prior to conveying such information. Records of any conveyance of information, or other action taken can also be archived.

Embodiments can also include receiving information descriptive of a risk management certification from an entity, such as a foreign bank, and a network address of a resource storing a risk management certification relating to the entity. The network address of the resource storing the risk management certification can be conveyed responsive to a request for information relating to the foreign bank, or other entity described by the risk management certification. Some embodiments can include receiving authorization from the entity to convey the network address.

Embodiments can also include receiving notice of an updated risk management certification and a network address of a resource containing an updated risk management certification. Notice of the updated risk management certification and a network address of a resource containing the updated risk management certification can be transmitted or otherwise conveyed to one or more recipients. Notification of a renewal date can also be transmitted to one or more appropriate parties.

Other embodiments of the present invention can include a computerized system, executable software, or a data signal implementing the inventive methods of the present invention. The computer server can be accessed via a network access device, such as a computer. Similarly, the data signal can be operative with a computing device, and computer code can be embodied on a computer readable medium.

Various features and embodiments are further described in the following figures, drawings and claims.

DETAILED DESCRIPTION

Figure 1A:
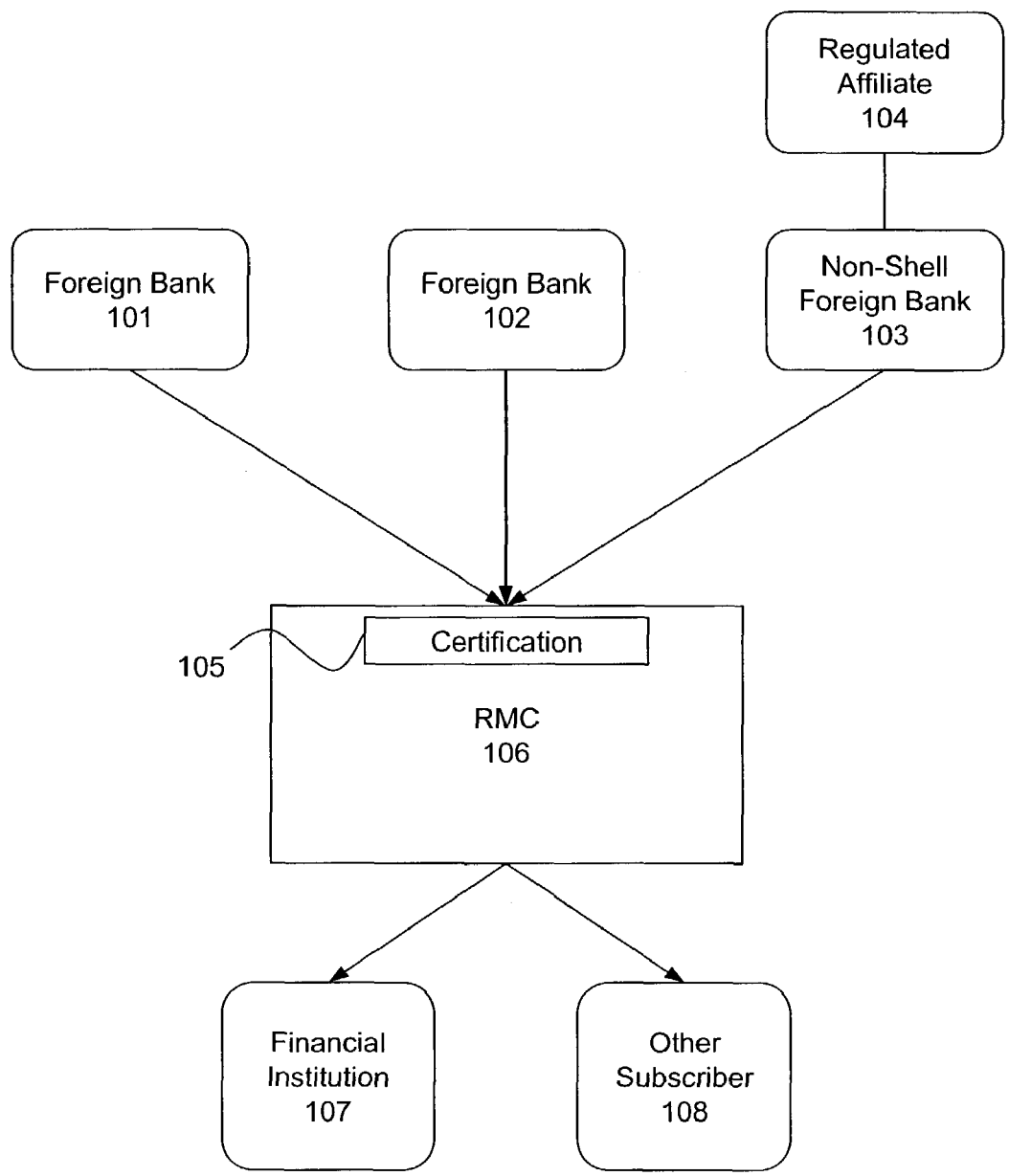
FIGS. 1a and 1b illustrate block diagrams of some embodiments of the present invention.

The present invention includes a method and system for facilitating the transfer of information relating to risk management, such as, for example, information directed towards compliance with the USA PATRIOT Act and certification of a foreign correspondent bank. Generally, a foreign bank or other entity can provide a RMC with information relating to compliance with government requirements, or other information, and allow the RMC to convey to information in whole or in part to interested parties. Centralized distribution of certification related information can facilitate consistent and accurate compliance with government related requirements.

Referring now to FIG. 1 a block diagram of one embodiment of the present invention is illustrated. In addition to other services that an RMC system 106 may provide, such as those described in related documents, an RMC system 106 can facilitate an exchange of information required to manage risk associated with a foreign bank 101-103 and regulated affiliate 104. In some embodiments, an RMC system 106 can act as a registry of information required for certification of a foreign correspondent bank according to risk management procedures, such as, for example, procedures required to meet obligations set forth by the USA PATRIOT Act. The RMC system 106 can receive and maintain certifications 105 responsive to the risk management procedures and make the certifications 105 available to one or more Financial Institutions 107, government entities, or other Subscriber 108 or interested party. In particular, the certifications 105 can be useful to manage risk by fulfilling obligations set forth in the USA PATRIOT Act for a Financial Institution 107 acting as a respondent bank to a foreign correspondent bank.

For the purposes of this application, a "Shell Bank" can include a foreign bank 101-103 without a physical presence in any country. A physical presence can be a place of business that is maintained by a foreign bank 101-103 and is located at a fixed address, other than solely an electronic address, in a country in which the foreign bank 101-103 is authorized to conduct banking activities.

A "Correspondent Account", with respect to a Financial Institution 107, can be an account established to receive deposits from, make payments on behalf of a foreign Financial Institution 107, or handle other financial transactions related to such institution.

A "Certification" 105 may be a compilation of information utilized by a Financial Institution 107 to assist the institution to manage risk related to dealing with a foreign Shell Bank. Certification 105 can include, among other things, documentation indicating that any Financial Institution 107 that maintains one or more correspondent accounts in the United States for a foreign bank 101-103 maintain records in the United States identifying the owner(s) of such foreign bank 101-103 and the name and address of a person who resides in the United States and is authorized to accept service of legal process for records regarding the correspondent account.

A Certification 105 established with the RMC system 106 can state that a foreign bank 101-103 that maintains a correspondent account with a covered Financial Institution 107 certifies either that it is not a Shell Bank; that it is a Shell Bank that it is a regulated affiliate of a non-Shell Bank; or that it is a Shell Bank that is not a regulated affiliate. In the case that a Shell Bank is not a regulated affiliate, prevailing law may prohibit a covered Financial Institution 107 from establishing or maintaining a correspondent account with that foreign bank 101-102.

Independent of a bank's or other Financial Institution's procurement of information, for certification or otherwise, a RMC 106 can gather and collect information relating to a Financial Institution. Information can be collected, for example, from public sources, such as government lists. Non-public information gathered by a subscriber 107-108 can also be collected and stored in a manner that will not violate prevailing law, such as, for example, in a Proprietary Risk Management Server 211. In some cases, the information may support or contradict information provided by a certification, such as whether a bank 101-102 is a Shell Bank.

Amendments to the anti-money laundering provisions of the Bank Secrecy Act (BSA), which are included in the USA PATRIOT Act may require that a Financial Institution 107 manage risk relating to correspondent accounts by ascertaining certain minimum information relating to the Financial Institution's 107 customers. In particular, a Financial Institution 107 may manage risk relating to correspondent accounts by certifying that it is not providing correspondent accounts to foreign Shell Banks and taking reasonable steps to ensure that a correspondent account provided to a foreign bank 101-103 is not being used to indirectly provide banking services to a foreign Shell Bank. Risk management procedures for a Financial Institution 107 that provides a correspondent account to a foreign bank 101-103 can include maintaining records relating to the foreign bank's 101-103 owners as well as records of an agent in the United States designated to accept service of legal process.

Risk management procedures implemented by a Financial Institution 107 may dictate, for example, that the Financial Institution 107 should not establish, maintain, administer, or manage a correspondent account in the United States for, or on behalf of Shell Bank. In addition, the risk management procedures may include taking reasonable steps to ensure that any correspondent account established, maintained, administered, or managed by a covered Financial Institution 107 in the United States for a foreign bank 101-103 is not being used by that foreign bank 101-103 to indirectly provide banking services to a foreign Shell Bank that is not a regulated affiliate.

A foreign bank 101-103 can certify, such as, for example, to the RMC 106, that it is not a Shell Bank. Risk management procedures can require that the RMC receive certification specifying a physical address for the foreign bank 101-103 and a regulator for the foreign bank 101-103. If a foreign bank 101-103 certifies that it is a regulated affiliate, the foreign bank 101-103 can be required to specify a name and address of a non-Shell Bank with which the foreign bank 101-103 is affiliated and a regulator for the non-Shell Bank and the regulated affiliate. Certification information received by the RMC 106 can be stored and organized for expeditious delivery to an interested party authorized by parties involved to receive the information.

A foreign bank 101-103 can also certify either that it does not provide banking services to any foreign Shell Bank, other than a regulated affiliate; or that it provides banking services to a foreign Shell Bank but will not use any of the correspondent accounts with a U.S. Financial Institution 107 to provide banking services to any foreign Shell Bank, other than a regulated affiliate.

In another aspect, a foreign bank 101-103 can certify the identity of its owner(s) and include street addresses, as well as the identity and address of its agent for service of legal process in the United States.

A foreign bank 101-103 can also certify that it will notify each Financial Institution 107 in the United States at which it maintains a correspondent account in writing within 30 calendar days of any change in facts or circumstances previously certified or contained in the annexes to the Certification 105.

In some embodiments, the RMC system 106 can be utilized to effect notice, of any change in facts or circumstances previously certified or contained in the annexes to the Certification 105. For those Financial Institutions 107 on record with RMC system 106 notice can be accomplished via delivery of an electronic document, printing remotely, facsimile, or hardcopy generated and physically delivered. A RMC system 106 can also be utilized to notify appropriate parties of administrative obligations such as, for example, notice of a change in facts contained in a Certification 105.

Embodiments can also include providing a copy of any certifications 105 to the Secretary of the Treasury and the Attorney General of the United States, or their delegates.

Risk management procedures can establish that reporting information required for Certification 105 is voluntary for a foreign banking institution 101-103; however, failure to provide information necessary to complete Certification 105 may preclude the establishment or continuation of correspondent accounts with the U.S. Financial Institution 107.

A subscriber 107-108 can include a Respondent Financial Institution 107 or other subscribing entity 108, including, for example: a regulator, a money transfer agency, bourse, an institutional or individual investor, an auditing firm, a law firm, any institution the business of which is engaging in financial activities or other entity or institution who may be involved with a financial transaction or other business transaction or any entity subject to legal and regulatory compliance obligations with respect to money laundering, fraud, corruption, terrorism, organized crime, regulatory and suspicious activity reporting, sanctions, embargoes and other regulatory risks and associated obligations.

Financial investments can include investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

FIG. 1A illustrates a scenario wherein a respondent Financial Institution 107 or other subscriber 108 can receive a Certification 105 from one or more foreign banks or affiliates 101-104 via an RMC 106. Certifications 105 registered with the RMC system 106 can be readily accessible to the respondent Financial Institution 107 or other subscriber 108 thereby facilitating collection of certifications 105, wherein the respondent Financial Institution 107 is relieved of having to ascertain a correct person to contact within each foreign bank 101-104 from which it requires Certification 105 and coordinate receipt of each Certification 105. As illustrated, the present invention can make it possible for the respondent Financial Institution 107 to only have to complete a single access to the RMC system 106 in order to receive multiple certifications 105, each from a separate foreign bank 101-102 or from a non-shell Foreign Bank 103 and/or a regulated affiliate 104. The Certification 105 can contain information to assist a U.S. Financial Institution 107 comply with prevailing law regarding correspondent accounts and other regulations.

Embodiments can include information that is received from a foreign bank 101-104 in any form that can accurately convey information necessary to complete the Certification 105. For example, information can be input into a graphical user interface (GUI), submitted via hard copy, facsimile, scanned image, or any other form of information conveyance. The RMC system 106 can store the Certification 105 and convey it upon request.

Similarly, Certification 105 information can be retrieved by a respondent Financial Institution 107 or other subscriber 108 using any available mechanism for conveying information, including, but not limited to: scanned image, database record retrieval, text file, facsimile, hard copy, data stored on a computer readable medium, or other mechanism.

Figure 1B:
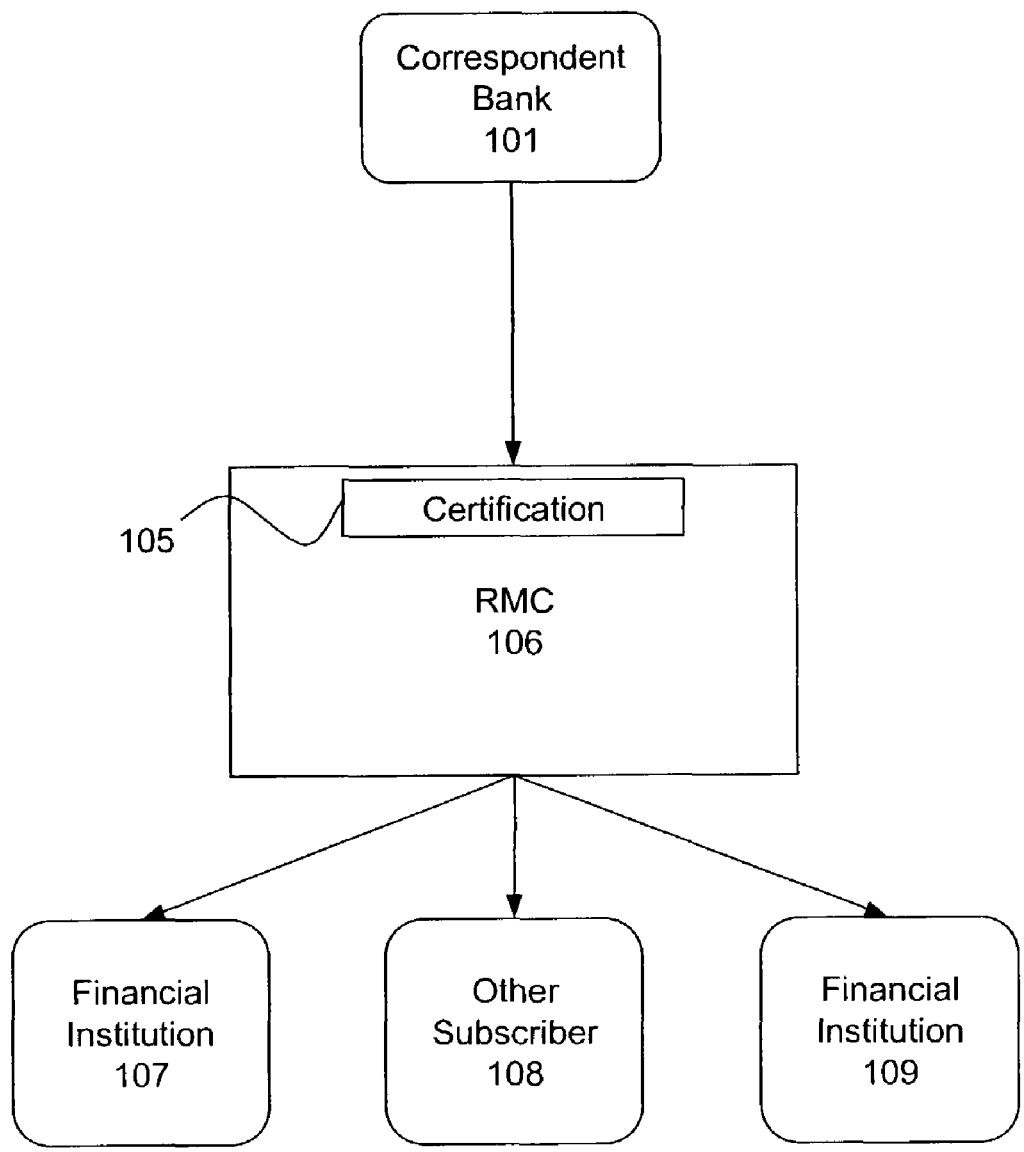

FIG. 1B is related to FIG. 1A and more clearly illustrates a scenario wherein a correspondent Foreign Bank 101 seeking to open a correspondent account can convey a Certification 105 to one or more respondent Financial Institutions 107 and 109 or other subscriber 108. In some embodiments, the correspondent Foreign Bank 101 can transmit information relating to the certification 105 to the RMC system 106. The RMC system 106 can store the information and generate a certification 105 and convey it to a respondent Financial Institution 107 and 109 or other subscriber 108 upon request of the correspondent Foreign Bank 101 or the Financial Institution 107 and 109 or other subscriber 108. Embodiments can also include transmission of a completed certification 105 to the RMC system 106, such as an image documents comprising the certification 105. The completed certification 105 can then be transmitted by the RMC system 106 to a Financial Institution 107 and 109 or other subscriber 108.

Figure 2:
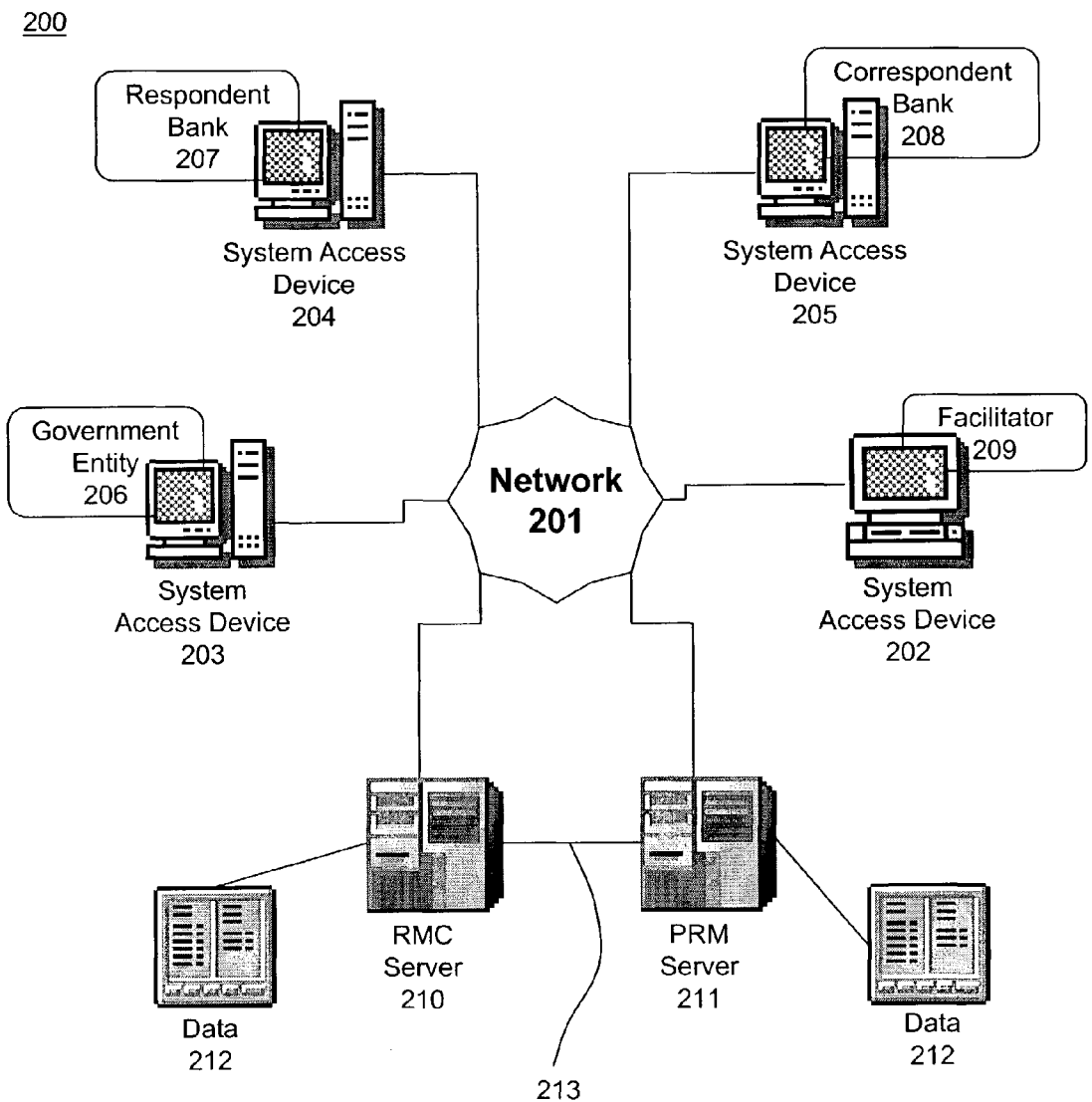
FIG. 2 illustrates a network of computer systems that can embody a correspondent bank registry.

Referring now to FIG. 2, a network diagram illustrating one embodiment of the present invention is shown 200. An automated RMC system 106 can include a computerized RMC server 210 accessible via a distributed network 201 such as the Internet, or a private network. A user 206-209, can use a computerized system or network access device 202-205 to receive, input, transmit or view information processed in the RMC server 210. A protocol, such as, for example, the transmission control protocol internet protocol (TCP/IP) can be utilized to provide consistency and reliability.

In addition, a proprietary risk management (PRM) server 211 can access the RMC server 210 via the network 201 or via a direct link 213, such as a T1 line, digital subscriber line (DSL), or other high speed pipe. The PRM server 211 can in turn be accessed by an affiliated user via a system access device 202-205 and a communications network 201, such as a local area network, or other private network, or even the Internet, if desired. For the purposes of this application, any function or reference to an RMC server 210 can also include a PRM server 211, except that the PRM server 211 may be more appropriate to store and access proprietary information that will not be shared outside of an organization except as allowed by prevailing applicable law. In addition, in some embodiments, a PRM server 211 may be utilized to calculate risk quotients or other subjective valuations which an RMC server 210 may be limited from doing by an RMC 106 provider.

A system access device 202-205 used to access the RMC server 210 can include a processor, memory and a user input device, such as a keyboard and/or mouse, and a user output device, such as a display screen and/or printer. The system access devices 202-205 can communicate with the RMC server 210 to access data and programs stored at the respective RMC server 210. A system access device 202-205 may interact with the RMC server 210 as if the RMC server 210 were a single entity in the network 200. However, the RMC server 210 may include multiple processing and database sub-systems, such as cooperative or redundant processing and/or database servers that can be geographically dispersed throughout the network 200.

The RMC server 210 can include one or more databases 212 storing data relating to risk management, and in particular to certification of a foreign bank 101-103 or affiliate 104, including, for example, docketing information and programming capable of tracking relative dates and entities involved. Information relating to and included in gathered certifications can be aggregated into a searchable data storage structure. Gathering data into an aggregate data structure 212, such as a data warehouse, allows a RMC system 106 to have the data readily available for processing a risk management search associated with a Correspondent Bank 101-104 certification. Aggregated data 212 can also be scrubbed or otherwise enhanced to aid in searching.

In one embodiment of enhancing data, data scrubbing can be utilized to implement a data warehouse comprising the aggregate data structure 212. Data scrubbing can be utilized to store information in a manner that gives efficient access to pertinent data. Scrubbing can facilitate expedient access to data commensurate with business decisions that will be based upon Risk management assessment provided.

Various data scrubbing routines can be utilized to facilitate aggregation of Risk variable related information. The routines can include programs capable of correcting a specific type of mistake, such as an incomprehensible address, or clean up a full spectrum of commonly found database flaws, such as field alignment or misplaced data and move it to a correct field, or removing inconsistencies and inaccuracies from like data. Other scrubbing routines can be directed directly towards specific legal issues, such as money laundering or terrorist tracking activities.

For example, a scrubbing routine can be used to facilitate various different spelling of one name. In particular, spelling of names can be important when names have been translated from a foreign language into English. A data scrubbing routine can facilitate risk variable searching for multiple spellings of an equivalent name or other important information. Such to routine can help correct database flaws. Accordingly, scrubbing routines can improve and expand data quality more efficiently than manual mending and also allow a subscriber 107-109 to quantify best practices for regulatory purposes.

Typically a user 206-209 will access the RMC server 210 using client software executed at a system access device 202-205. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the RMC server 210 to the system access device 202-205 and executed at the system access device 202-205 as part of RMC risk management software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
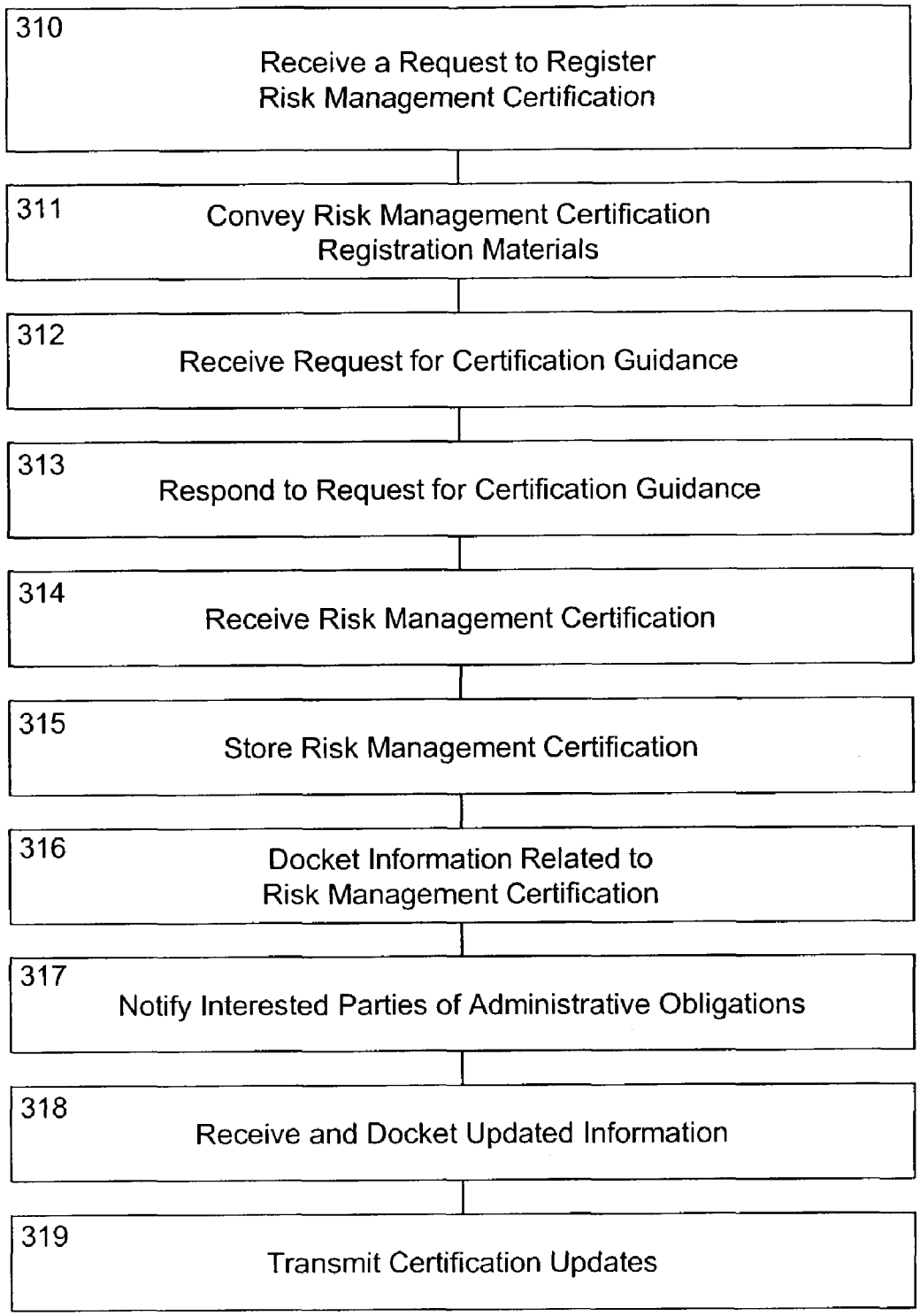
FIG. 3 illustrates a flow of exemplary steps that can be executed while implementing some embodiments of the present invention.

Referring now to FIG. 3, steps that can be performed while practicing the present invention are illustrated. From the perspective of an RMC system 106 or RMC provider, at 310 a request to register a risk management certification with the RMC system 106 can be received, such as, for example, via an electronic communication, facsimile, hardcopy, or voice call. At 311, the RMC system 106 can convey the certification materials to the entity that wishes to register or the entity's agent. The materials can be conveyed, for example, via electronic file transfer, e-mail, facsimile, hardcopy, voice communication or other communications vehicle. An exemplary certification that may currently be useful to address obligations incurred under the USA PATRIOT Act is attached hereto as Appendix A.

At 312, an RMC system 106 may receive a request for guidance in providing the certification materials. Guidance may be necessary, for example, to interpret obligations relating to what needs to be certified in order to comply with various regulatory requirements, such as those set forth in the USA PATRIOT Act and the relative complexity of some information that may need interpretation.

For example, in complying with the USA PATRIOT Act the task of ascertaining who constitutes an "owner" that should be reported can be subject to a fair amount of work and interpretation. An owner can mean any person who is a large direct owner, an indirect owner, and certain small direct owners. A person can mean any individual, bank, corporation, partnership, limited liability company, or any other legal entity, except that members of the same family shall be considered one person; and voting shares or other voting interests means shares or other interests that entitle the holder to vote for or select directors (or individuals exercising similar functions).

The USA PATRIOT Act indicates that a small direct owner may or may not need to be reported depending on whether two or more small direct owners in the aggregate own 25 percent or more of the voting securities or interests of the foreign bank and are owned by the same indirect owner. A large direct owner of a foreign bank can be a person who owns, controls, or has power to vote 25 percent or more of any class of voting securities or other voting interests of the foreign bank; or controls in any manner the election of a majority of the directors (or individuals exercising similar functions) of the foreign bank. The identity of each large direct owner is subject to reporting. If any large direct owner of a foreign bank 101-103 is majority-owned by another person, or by a chain of majority-owned persons, an indirect owner is any person in the ownership chain of any large direct owner who is not majority-owned by another person. If any two or more small direct owners of a foreign bank in the aggregate own, control, or have power to vote twenty five percent or more of any class of voting securities or other voting interests of the foreign bank and are majority-owned by the same person, or by the same chain of majority-owned persons, the indirect owner can be any person in the ownership chain of the small direct owners who is not majority-owned by another person. Each indirect owner may be subject to reporting.

Guidance relating to interpretation and compliance may be needed as each foreign institution attempts to properly and consistently provide certification to each U.S. Financial Institution with which the foreign institution has a correspondent banking relationship. Guidance and centralization offered by an RMC 106 can facilitate a cohesive certification and minimize confusion, redundancy, inaccuracy and contradictions that may result from multiple parties each interpreting and translating such guidelines on their own. In addition, the amount of resources and administration overhead associated with maintaining such records can be lessened by a centralized approach.

At 313, guidance may be provided by the RMC system 106 via online documentation, artificial intelligence programs, online question and answer materials, live administrative assistance, referral to a third party or other manner of responding to the request for guidance. Some embodiments can include guidance that ascertains the completeness of certification information conveyed by a foreign bank 101-104, such as, for example guidance as to whether entries have been set forth for all required inputs and a document has been properly executed where required. Electronic signatures may be sufficient in some embodiments to complete execution.

Embodiments can also include a verification step which can independently research the veracity of information put forth in a certification. Other embodiments can convey any information put forth with no value judgment, research or other indication relating to the veracity or completeness of any information conveyed in a certification.

At 314, the RMC system 106 can also receive a risk management certification and at 315 the certification can be stored in a retrievable data storage device. In addition, at 316 the information descriptive of or relating to the certification, as well as information descriptive of the entities involved, can be docketed. The docket can be utilized to track critical dates, entities involved, contact information and the like. In some embodiments, docketing can include parsing information contained in a Certification 105 and storing the parsed information in a database in order to facilitate analysis and docketing of the information. For example, data can be configured to track dates relating to the certification, dates relating to actions taken, contact information, requests, authorizations and other pertinent information. Other embodiments can include docketing information descriptive of a Certification 105.

At 317, the RMC system 106 can notify interested parties of administrative obligations, such as the obligation to re-certify every two years for compliance with the USA PATRIOT Act. At 318, the RMC system 106 can receive updated information, such as information related to or otherwise comprising a certificate renewal and at 319 the updated certification information can be transmitted to interested parties.

Figure 4:
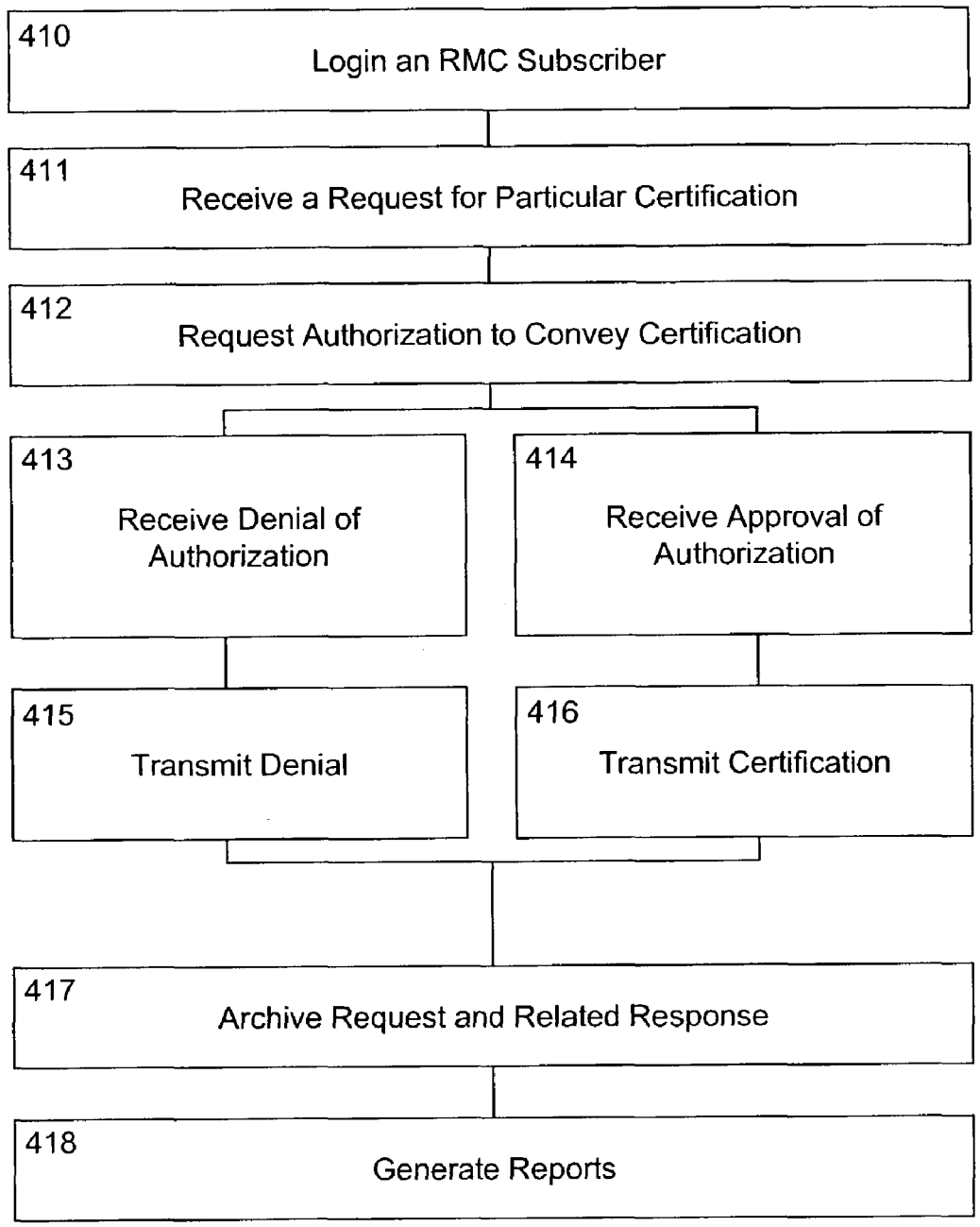
FIG. 4 illustrates a flow of exemplary steps that can be executed while implementing other embodiments the present invention.

Referring now to FIG. 4, additional steps that can be performed while implementing some embodiments of the present invention are illustrated. At 410, a RMC system 106 can login an RMC subscriber and at 411 the RMC system 106 can receive a request for a particular certification. The login can be accomplished in any manner that serves to identify the subscriber and allow for communication between the RMC system 106 and the subscriber, such as via login at a website or other electronic interface. At 412, responsive to a request for a certification, the RMC system 106 can request authorization to convey the certification from a party designated to grant such authorization, such as a compliance officer for the foreign bank 101-104 for which the certification is requested.

At 413 and 414 the RMC system 106 may receive a response to the request for authorization to convey the certification. At 413 a denial of required authorization can be received. Accordingly, at 415 the RMC system 106 can transmit a denial for the request of certification authorization. Alternatively, at 414, the RMC system 106 may receive an approval for the request for authorization and at 416 transmit the certification to the requestor.

At 417, a request for a certification can be archived, along with a related response. At 418, the RMC system 106 can also be utilized to generate one or more reports relating to a request for certification and associated action resultant to the request.

Figure 5:
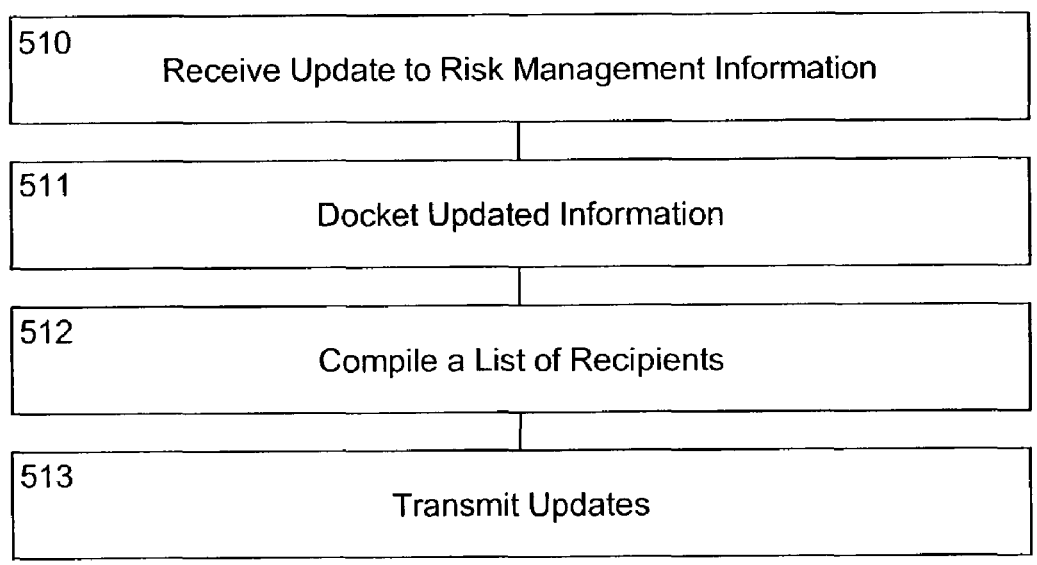
FIG. 5 illustrates a flow of exemplary steps that can be executed while implementing updates in some embodiments the present invention.

Referring now to FIG. 5, steps relating to updating risk management information according to some embodiments of the present invention are illustrated. Risk management information which can be updated can include certification information utilized to comply with the USA PATRIOT Act. At 510, a RMC system 106 can receive updated information, such as a change in contact information, change in ownership, change in agent to receive service of a subpoena or other change. At 511, the received updates can be docketed to facilitate in processing and at 512, a list of recipients who are to receive the updates can be compiled. Recipients can include, for example, financial institutions or other subscribers 107-109 that have received a previous certification. At 513, updates can be transmitted or otherwise conveyed to the members included on the list of recipients.

Figure 6:
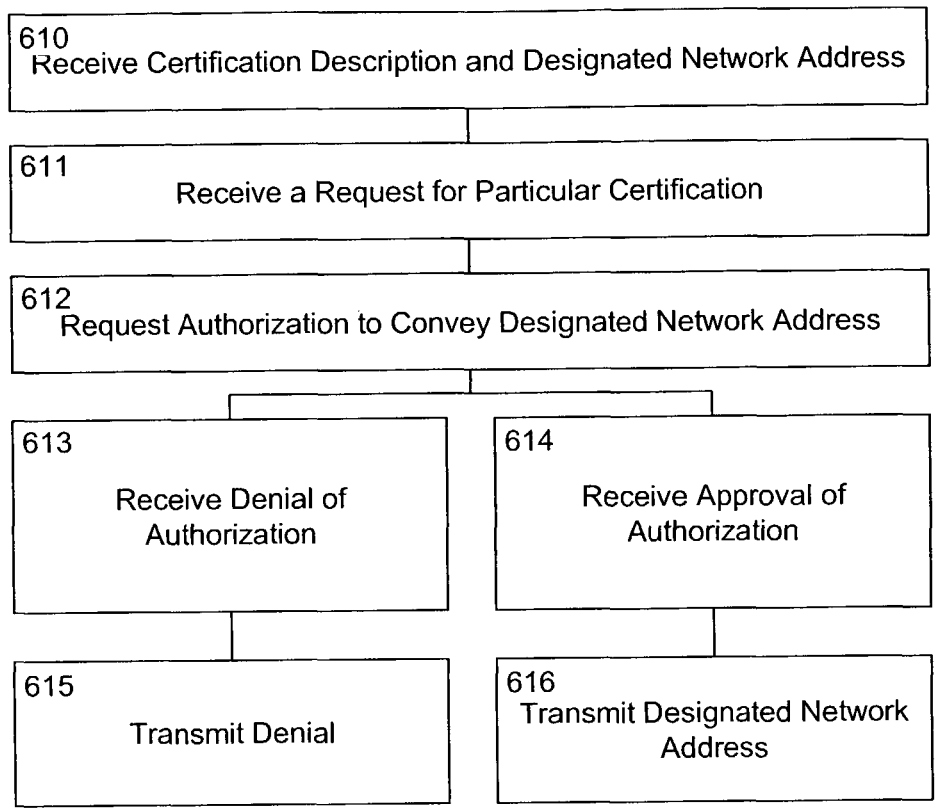
FIG. 6 illustrates a flow of exemplary steps that can be executed while implementing embodiments the present invention utilizing a designated network address to locate a resource.

Referring now to FIG. 6, some embodiments of the present invention can include an RMC system 106 which does not actually receive risk management certification information, such as a certification to comply with the USA PATRIOT Act, but instead, at 610 receives a description of a certification 105 and a designated network address at which the certification can be accessed. A designated network address can include, for example, a TCP/IP address, a uniform resource locator, or any other identifying mechanism that can direct access to a particular network resource. At 611, the RMC system 106 can receive a request to convey a particular certification and at 612 the RMC system 106 can request authorization to convey the designated network address containing the particular certification. At 613 and 614 a denial or authorization of the request to convey the designated network address can be received. At 613 a denial of authorization is received and accordingly, at 615 the RMC can transmit a denial of the request for the certification. At 614 an approval granting authorization is received, and accordingly, at 616 the RMC system 106 can transmit or otherwise convey the designated network address at which the certification information can be accessed.

Figure 7:
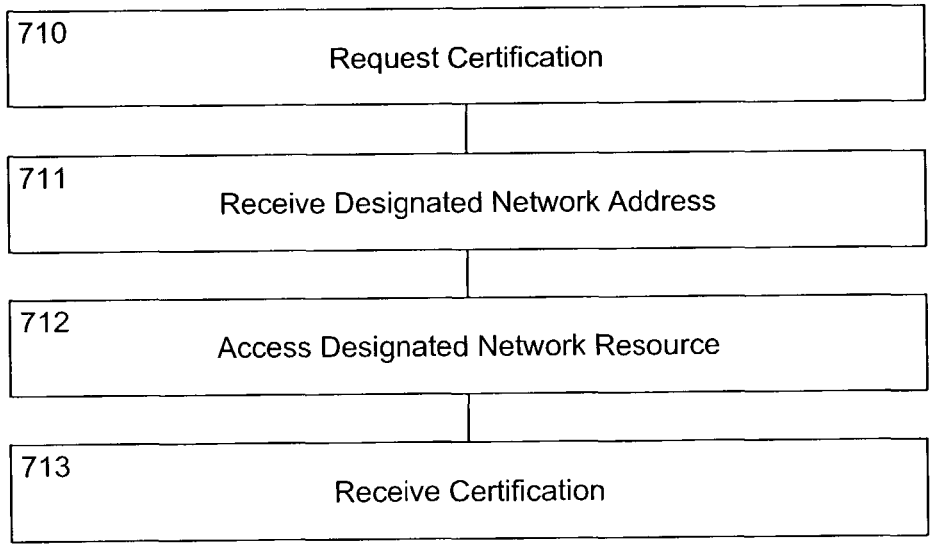
FIG. 7 illustrates a flow of additional exemplary steps that can be executed while implementing embodiments the present invention utilizing a designated network address to locate a resource.

Relatedly, as illustrated in FIG. 7, in some embodiments, at 710, a subscriber, such as a respondent Financial Institution or other entity 107-109, can request certification information from the RMC system 106 and at 711 receive a designated network address of a resource that contains a related certification 105 which is available via the network 201. At 712, a respondent Financial Institution or other entity 107-109 can access a network resource located at the address conveyed by the RMC system 106 and at 713 receive the certification information.

Figure 8:
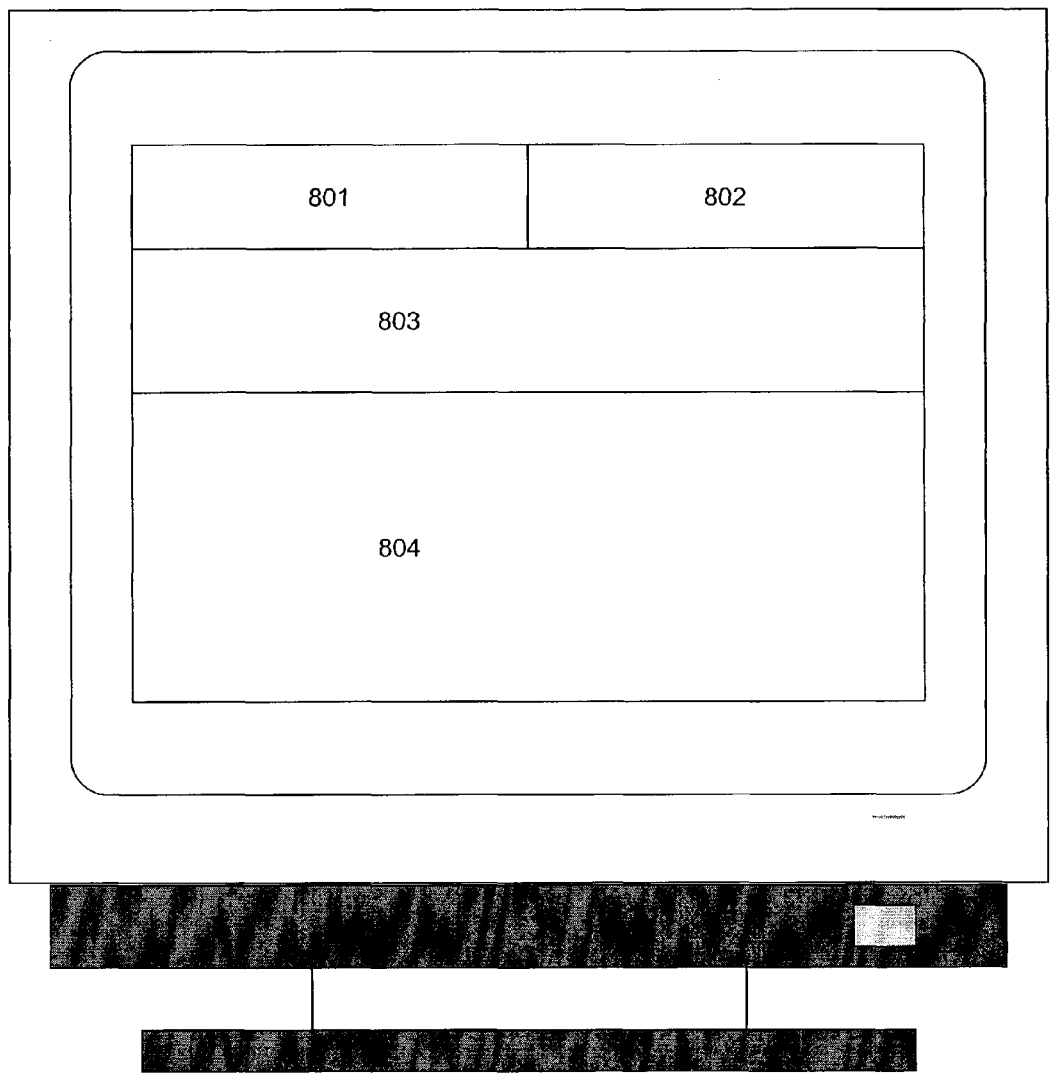
FIG. 8 illustrates an exemplary graphical user interface that can implement various aspects of the present invention.

Referring now to FIG. 8, an exemplary GUI 800 that can be utilized while practicing the present invention is illustrated. A portion of a display 801 can display information that relates to a respondent Financial Institution, such as a U.S. Bank. Another portion of the display 802 can include information descriptive of a correspondent Foreign Bank 101-103 and any regulated subsidiaries 104. Still another portion 803 can contain certification information. A portion 804 can also display instructions relating to how to obtain a certification 105.

Figure 9:
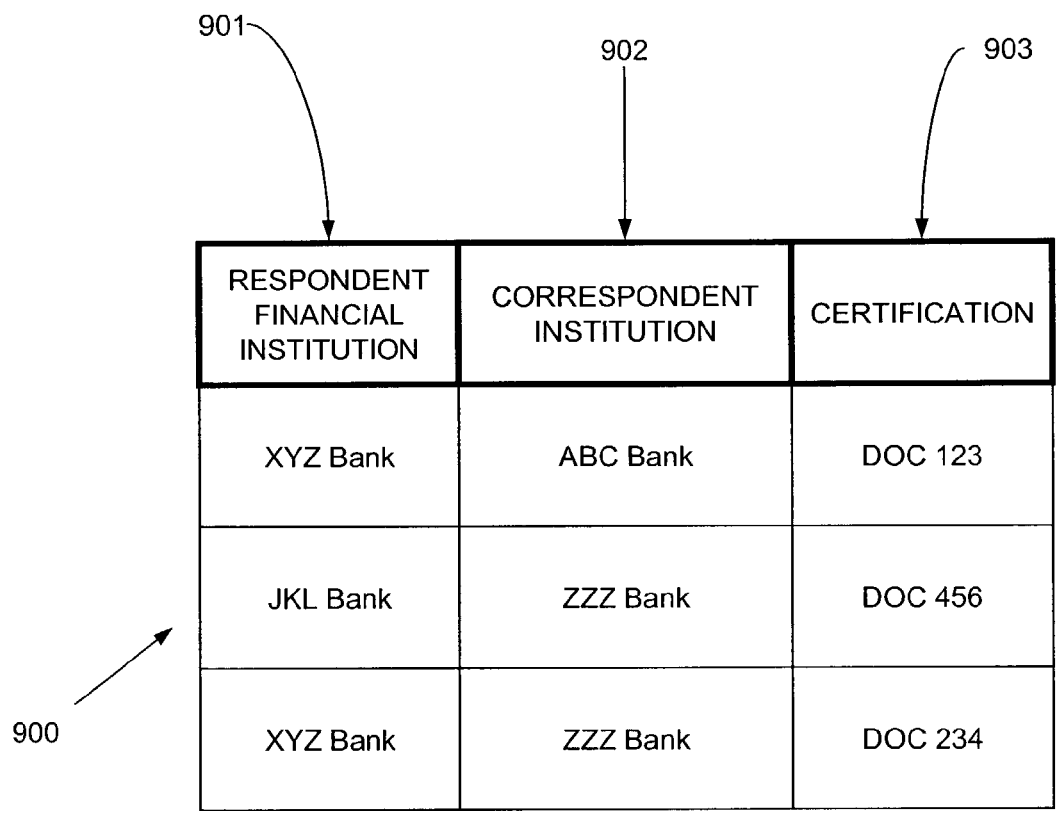
FIG. 9 illustrates an exemplary data structure that can be utilized to implement certain aspects of the present invention.

Referring now to FIG. 9, a portion of a design of a database that can be utilized while implementing the present invention is illustrated. The database 900 can include a field containing data descriptive of a respondent Financial Institution 901 as well as a field containing data descriptive of a correspondent institution 902. Another field can hold data descriptive of a related certification 903.

A number of embodiments of the present invention have been described. Nevertheless, it will be understood that various modifications may be made without departing from the spirit and scope of the invention. For example, certified hard copy documents can be gathered and scanned into the RMC system 106 such that the scanned image can be forwarded to a subscriber as appropriate. In addition, certification data stored with the RMC 106 can indicate an agent for legal service which can be utilized in conjunction with an electronic subpoena service to serve a subpoena. Still other embodiments include certification data and/or documents that will expire and be locked, such as with encryption after a set period of time has elapsed, such as, for example a period for which the data will remain current. Accordingly, other embodiments are within the scope of the following claims.

What is claimed is:

1. A processor-implemented method for managing risk associated with a correspondent account, the method for comprising:

receiving, by a domestic financial institution, regulatory risk management certification information from a foreign bank related to the correspondent account, the regulatory risk management certification information including documentation identifying an owner of the foreign bank and the name and address of a person residing domestically that is authorized to accept service of legal process for records regarding the correspondent account;

aggregating via a processor the received regulatory risk management certification information into a searchable storage structure;

applying a data scrubbing component routine to the aggregated regulatory risk management certification information to enhance data formality;

storing the aggregated and scrubbed regulatory risk management certification information in compliance with the searchable storage structure in a computer server;

receiving a request to register the regulatory risk management certification information from a requestor;

receiving and responding to a request for guidance for facilitating registration of the regulatory risk management certification information;

registering the regulatory risk management certification information with a risk management clearinghouse; and outputting, in response to the registration request, the registered regulatory risk management certification information to the requestor.

2. The method of claim 1 additionally comprising docketing information relating to the regulatory risk management certification information received.

3. The method of claim 1 additionally comprising ascertaining the completeness of the regulatory risk management certification information received.

4. The method of claim 1 additionally comprising receiving updated information relating to the regulatory risk management certification information and transmitting the updated information to appropriate parties.

5. The method of claim 1 additionally comprising requesting authorization to convey the regulatory risk management certification information to a requestor of the regulatory risk management certification information.

6. The method of claim 1 additionally comprising archiving actions taken relating to certification.

7. A computerized system for managing risk associated with a correspondent account, the system comprising:

a computer server accessible with a system access device via a communications network; and executable software stored on the server and executable on demand, the software operative with the server to cause the server to:

receive, by a domestic financial institution, regulatory risk management certification information from a foreign bank related to the correspondent account, the regulatory risk management certification information including documentation identifying an owner of the foreign bank and the name and address of a person residing domestically that is authorized to accept service of legal process for records regarding the correspondent account;

aggregate the received regulatory risk management certification information into a searchable storage structure;
apply a data scrubbing component to the aggregated regulatory risk management certification information to enhance data formality;
store the aggregated and scrubbed information in compliance with the searchable storage structure in a computer server;
receive a request for particular certification information from a requestor;
receive and respond to a request for guidance for facilitating registration of the regulatory risk management certification information;
register the regulatory risk management certification information with a risk management clearing house; and
transmit, in response to the particular certification information request, the registered particular certification information to the requestor.

8. The computerized system of claim 7 wherein the server comprises a proprietary risk management server.

9. The computerized system of claim 7, wherein the software operative with the server causes the server to docket information relating to the regulatory risk management certification information received.

10. The computerized system of claim 7, wherein the software operative with the server causes the server to ascertain the completeness of the regulatory risk management certification information received.

11. The computerized system of claim 7, wherein the software operative with the server causes the server to receive updated information relating to the regulatory risk management certification information and transmit the updated information to appropriate parties.

12. The computerized system of claim 7, wherein the software operative with the server causes the server to request authorization to convey the regulatory risk management certification information to a requestor of the regulatory risk management certification information.

13. The computerized system of claim 7, wherein the software operative with the server causes the server to archive actions taken relating to certification.

14. A tangible processor-readable medium having processor-executable program instructions residing thereon, wherein the computer executable program instructions are issuable by a processor to:
receive, by a domestic financial institution, regulatory risk management certification information from a foreign bank related to the correspondent account, the regulatory risk management certification information including documentation identifying an owner of the foreign bank and the name and address of a person residing domestically that is authorized to accept service of legal process for records regarding the correspondent account;
aggregate the received regulatory risk management certification information into a searchable storage structure;
apply a data scrubbing component to the aggregated regulatory risk management certification information to enhance data formality;
store the aggregated and scrubbed information in compliance with the searchable storage structure in a computer server;
receive a request for particular certification information from a requestor;
receive and respond to a request for guidance for facilitating registration of the regulatory risk management certification information;
register the regulatory risk management certification information with a risk management clearing house; and
transmit, in response to the particular certification information request, the registered particular certification information to the requestor.

15. The tangible processor-readable medium of claim 14, wherein the processor-executable program instructions are issuable by a processor to docket information relating to the regulatory risk management certification information received.

16. The tangible processor-readable medium of claim 14, wherein the processor-executable program instructions are issuable by a processor to ascertain the completeness of the regulatory risk management certification information received.

17. The tangible processor-readable medium of claim 14, wherein the processor-executable program instructions are issuable by a processor to receive updated information relating to the regulatory risk management certification information and transmit the updated information to appropriate parties.

18. The tangible processor-readable medium of claim 14, wherein the processor-executable program instructions are issuable by a processor to request authorization to convey the regulatory risk management certification information to a requestor of the regulatory risk management certification information.

19. The tangible processor-readable medium of claim 14, wherein the processor-executable program instructions are issuable by a processor to archive actions taken relating to certification.

* * * * *